United States Patent
Ochiishi et al.

(10) Patent No.: US 10,016,890 B2
(45) Date of Patent: Jul. 10, 2018

(54) ROBOT TRAVELING SYSTEM PROVIDED WITH CABLE TRACK, ROBOT SYSTEM, AND MACHINING SYSTEM

(71) Applicant: FANUC CORPORATION, Minamitsuru-gun, Yamanashi (JP)

(72) Inventors: Yoshinori Ochiishi, Yamanashi (JP); Masaru Oda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 552 days.

(21) Appl. No.: 14/623,038

(22) Filed: Feb. 16, 2015

(65) Prior Publication Data

US 2015/0231781 A1    Aug. 20, 2015

(30) Foreign Application Priority Data

Feb. 19, 2014 (JP) .................................. 2014-029489

(51) Int. Cl.
*B25J 5/02* (2006.01)
*B25J 19/00* (2006.01)
*H02G 11/00* (2006.01)

(52) U.S. Cl.
CPC ............. *B25J 5/02* (2013.01); *B25J 19/0025* (2013.01); *H02G 11/006* (2013.01)

(58) Field of Classification Search
CPC ........ B25J 5/02; B25J 19/0025; H02G 11/006
See application file for complete search history.

(56) References Cited

U.S. PATENT DOCUMENTS

| | | | | |
|---|---|---|---|---|
| 6,322,119 B1 * | 11/2001 | Schmidt | ..................... | B25J 5/02 294/103.1 |
| 7,357,842 B2 * | 4/2008 | Ishikawa | ................ | G03B 27/32 118/50 |
| 7,464,623 B2 * | 12/2008 | Okada | .................. | B25J 19/0029 74/490.05 |
| 8,020,468 B2 * | 9/2011 | Yang | ..................... | F16H 7/1254 474/109 |
| 2005/0072261 A1 | 4/2005 | Okada et al. | | |
| 2014/0012420 A1 | 1/2014 | Yasue | | |

FOREIGN PATENT DOCUMENTS

| | | |
|---|---|---|
| CN | 102699894 | 10/2012 |
| CN | 202517473 | 11/2012 |
| DE | 3716977 A1 | 12/1988 |
| DE | 9010796 U1 | 7/1990 |
| DE | 102009012140 A1 | 3/2009 |
| JP | S4830372 Y1 | 9/1973 |
| JP | S62203795 A | 9/1987 |
| JP | S6374032 U | 5/1988 |
| JP | H04315587 A | 11/1992 |
| JP | H0775991 A | 3/1995 |
| JP | 10157847 | 6/1998 |
| JP | 2005-096018 | 4/2005 |
| WO | 2013027283 | 2/2013 |

* cited by examiner

*Primary Examiner* — Michael S Lowe
(74) *Attorney, Agent, or Firm* — RatnerPrestia

(57) ABSTRACT

A robot traveling system, which enables sufficient space to be secured by a machine that is installed along a rail. The robot traveling system is provided with a rail, a carriage which can move along the rail and which supports a robot, a drive mechanism which drives the carriage, and a cable track which houses a cable which has a connecting end which is connected to the robot and is laid at the bottom side of the rail along that rail.

14 Claims, 7 Drawing Sheets

ROBOT TRAVELING SYSTEM PROVIDED WITH CABLE TRACK, ROBOT SYSTEM, AND MACHINING SYSTEM

BACKGROUND OF THE INVENTION

1. Field of the Invention

The present invention relates to a robot traveling system which is provided with a cable track which holds a cable which is connected to a robot, a robot system which is provided with a robot traveling system, and a machining system.

2. Description of the Related Art

Known in the art is a robot traveling system which is provided with a carriage which supports a robot and which makes a robot move along a rail and where a cable track which holds a cable which is connected to the robot is laid at the bottom side of the carriage (for example, Japanese Patent Publication No. 2005-096018A).

In a conventional robot traveling system, it was not possible to secure sufficient space from the machines (for example, machining devices) which were installed along the rail, so it was difficult for a user to physically access that machines for maintenance and other work.

SUMMARY OF THE INVENTION

In one aspect of the present invention, the robot traveling system is provided with a rail; a carriage movable along the rail and supporting a robot; a drive mechanism for driving the carriage; and a cable track coupled with the carriage and housing a cable which has a connecting end which is connected to the robot. The cable track is laid along the rail at lower side of the rail.

The drive mechanism may include a power generator which is arranged stationary with respect to the rail; and a power transmitter which transmits power generated by the power generator to the carriage. The power generator may include a servo motor. The power transmitter may include a timing belt which is connected to an output shaft of the servo motor.

The carriage may include a seat which is placed on the rail; and a leg which extends downward from the seat and which is coupled with the cable track at lower side of the rail. The drive mechanism may be mechanically connected to a bottom part of the seat and may give power to the seat. The connecting end of the cable may be arranged exposed on the seat.

A base of the robot which is fastened to the carriage, the seat, and the rail may have substantially the same maximum width in a direction perpendicular to the direction of extension of that rail. The cable track may have a maximum width in the direction perpendicular to the direction of extension of the rail which is not more than the maximum width of the base of the robot, the seat, and the rail.

In another aspect of the present invention, a robot system includes the above robot traveling system; a robot which is placed on the carriage; and a robot controller which controls the robot. The robot controller and the drive mechanism may be electrically connected via a cable. The robot controller may control the drive mechanism. The robot system may further include a drive mechanism controller which controls the drive mechanism.

In still another aspect of the present invention, a machining system includes the above robot traveling system; a robot which is placed on the carriage; a machining device which is arranged along the rail; a robot controller which controls the robot; and a machining device controller which controls the machining device. The machining device controller may control the drive mechanism.

BRIEF DESCRIPTION OF THE DRAWINGS

The above and other objects, features, and advantages of the present invention will become further clearer by the following description of the preferred embodiments given while referring to the attached drawings, in which.

DESCRIPTION OF THE PREFERRED EMBODIMENTS

Figure 1:
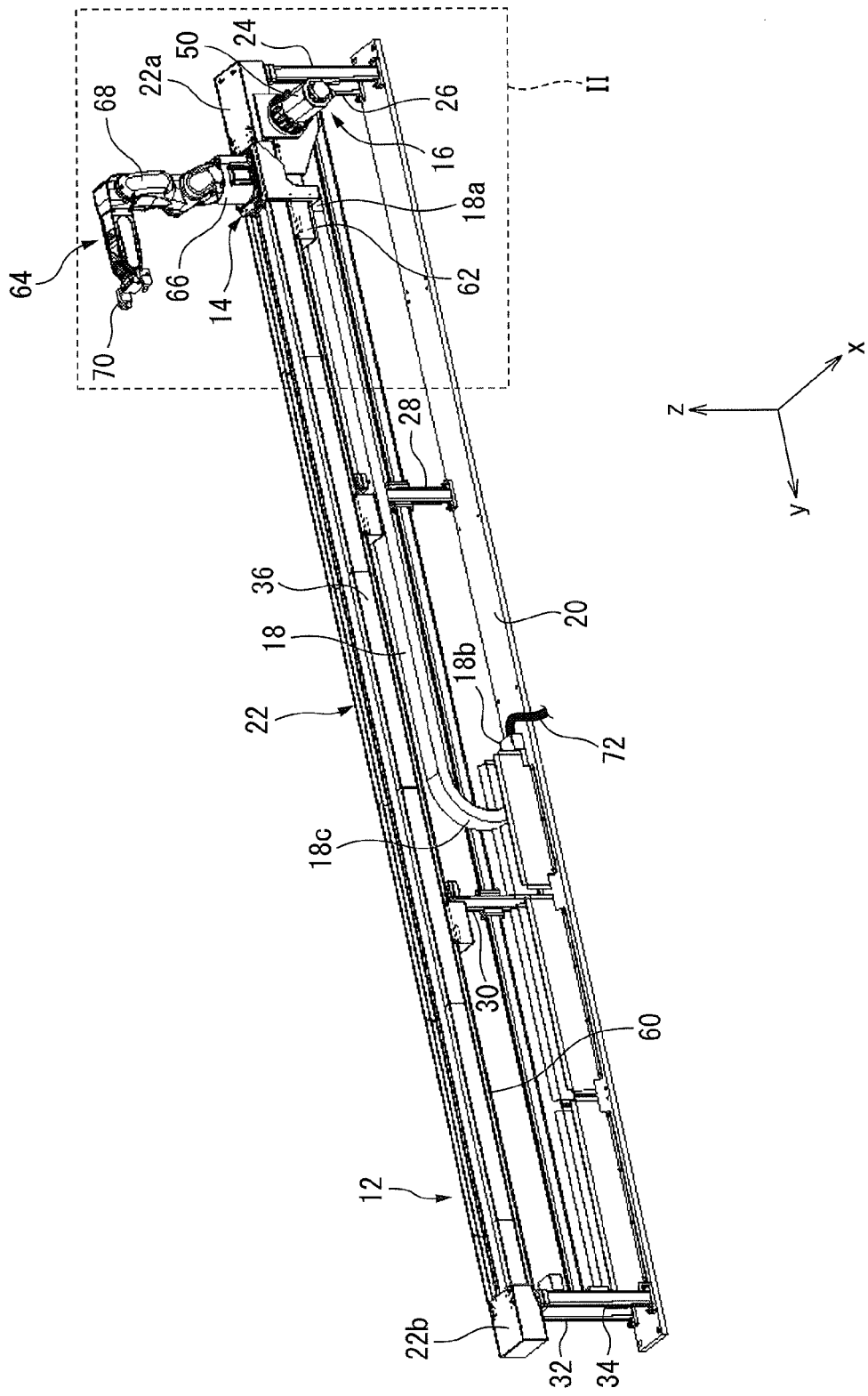
FIG. 1 is a perspective view of a robot traveling system according to an embodiment of the present invention.

Below, embodiments of the present invention will be explained with reference to the drawings. First, referring to FIG. 1 to FIG. 4, a robot traveling system 10 according to an embodiment of the present invention will be explained. Note that, in the following explanation, the front-rear direction, left-right direction, and up-down direction respectively correspond to the y-axis direction, x-axis direction, and z-axis direction of the Cartesian coordinate system shown in FIG. 1 to FIG. 4. Further, the front direction, the left direction, and the upper direction respectively correspond to the y-axis plus direction, x-axis plus direction, and the z-axis plus direction.

The robot traveling system 10 is for moving the robot 64 in the front-rear direction, and includes a rail assembly 12, carriage 14, drive mechanism 16, and cable track 18. The rail assembly 12 includes a base part 20 linearly extending in the front-rear direction; a rail 22 arranged separated from the base part 20 upwardly, and extending in the front-rear direction parallel to the base part 20; and a plurality of supports 24, 26, 28, 30, 32, and 34 which extend in the up-down direction between the base part 20 and rail 22 so as to support the rail 22 above the base part 20.

The rail 22 includes a left side wall 36 and right side wall 38 which extend in the front-rear direction so as to face each other; a right guide rail 40 (FIG. 2) extending in parallel with the right side wall 38 so as to be arranged adjoining the right side wall 38; and a left guide rail 42 (FIG. 2) extending in parallel with the left side wall 36 so as to be arranged adjoining the left side wall 36.

The carriage 14 has a substantially U-shaped profile when seen from the front side, and is attached to the rail 22 so as to be movable along the rail 22. Specifically, the carriage 14 includes a seat 44 placed on the rail 22; and a leg 46 extending downward from the seat 44. The seat 44 is a square-shaped flat plate which is slidably arranged on the rail 22.

The leg 46 has an approximately L-shaped profile when seen from the rear side. In the present embodiment, the leg 46 is constituted by a bracket member independent from the seat 44, and fastened to the seat 44 by bolts 45. The leg 46 includes a first part 46a extending downward from the left edge of the seat 44; and a second part 46b extending from the bottom end of the first part 46a in the right direction. The first part 46a extends from the left edge of the seat 44 downward to lower side of the rail 22. The second part 46b is perpendicular to the first part 46a and is arranged separated from the bottom end of the rail 22 downward by a predetermined distance.

An engagement part 48 is provided at the bottom surface 44a of the seat 44. The engagement part 48 slidably engages the right guide rail 40 and left guide rail 42, while engaging a timing belt 60 stated below. The seat 44 receives power from the timing belt 60 through the engagement part 48 in order to move in the front-rear direction, and is guided by the right guide rail 40 and left guide rail 42 to move in the front-rear direction.

The drive mechanism 16 includes a servo motor 50 and a power transmitter 52. The servo motor 50 functions as a power generator for generating power to move the carriage 14. The servo motor 50 is fastened to the rear end 22a of the rail 22 and arranged stationary with respect to the rail 22. Specifically, the servo motor 50 is bolted to the left side surface of the rear end 22a of the rail 22 via a mounting plate 54.

Figure 2:
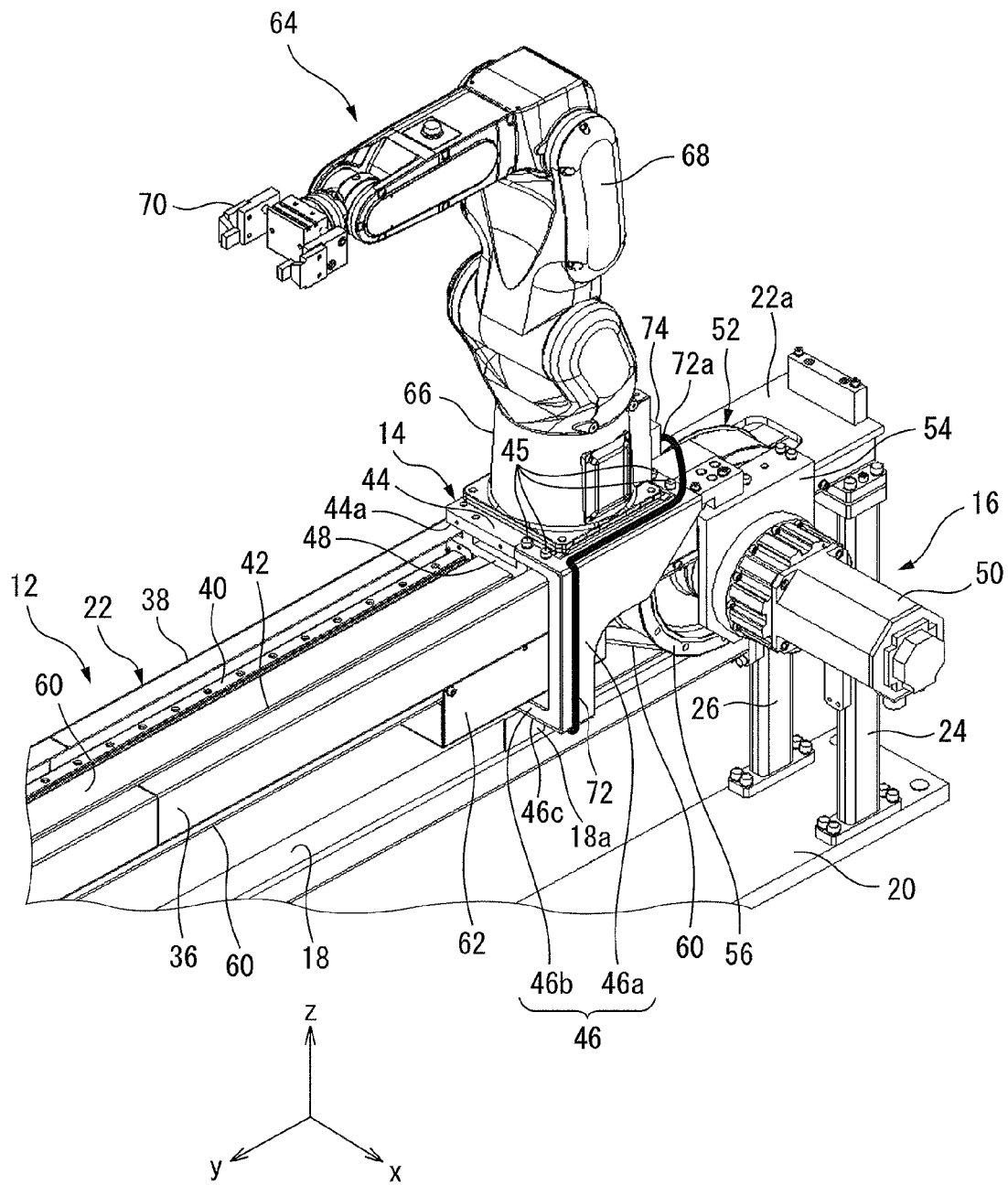
FIG. 2 is an enlarged view of a region II in FIG. 1.
Figure 4:
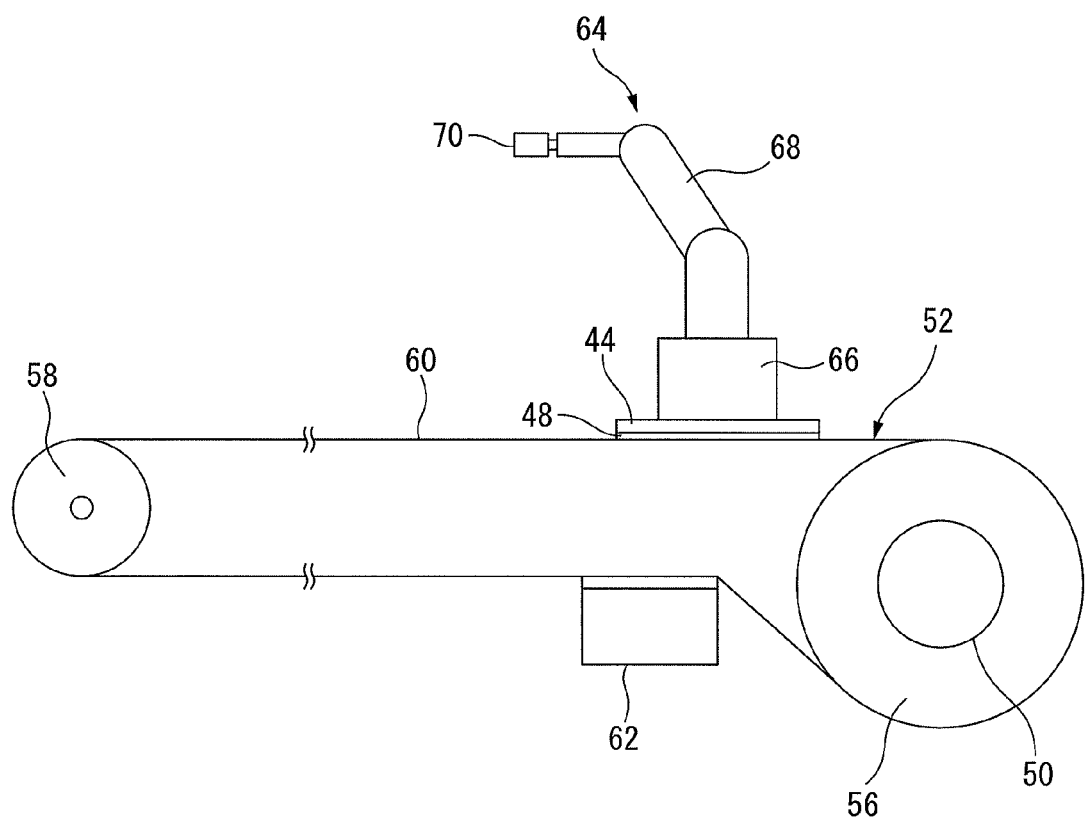
FIG. 4 is a view which schematically shows a servo motor, first and second pulleys, timing belt, and belt guide of the robot traveling system shown in FIG. 1.
Figure 4:
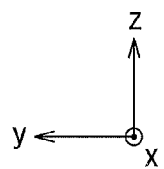

As shown in FIG. 2 and FIG. 4, the power transmitter 52 includes a first pulley 56 rotatably attached to the rear end 22a of the rail 22 and fixed to the output shaft (not shown) of the servo motor 50; a second pulley 58 rotatably attached to the front end 22b (FIG. 1) of the rail 22; and a timing belt 60 strung over the outer peripheries of the first pulley 56 and the second pulley 58.

The first pulley 56 has a diameter larger than the second pulley 58 and is driven to rotate by the output shaft of the servo motor 50. On the outer surface of the timing belt 60, an engagement part (not shown) constituted by e.g. a concave-convex part is formed. The engagement part of the timing belt 60 engages the engagement part 48 of the seat 44. The timing belt 60 is arranged between the right guide rail 40 and the left guide rail 42, and strung so as to pass just below the seat 44.

A belt guide 62 is provided adjacent to the front side of the first pulley 56 in order to guide the timing belt 60. The belt guide 62 is fixed to the bottom end of the rail 22 so as to hold the timing belt 60 inside thereof. The timing belt 60 is guided by the belt guide 62 and is strung so as to be parallel with the rail 22 at front side of the belt guide 62.

A robot 64 is placed on the carriage 14. The robot 64 includes a robot base 66 fastened on the seat 44 of the carriage 14; a multi-articulated robot arm 68 swiveably connected to the robot base 66; and a robot hand 70 rotatably connected to the front end of the robot arm 68. The robot 64 is moved by the carriage 14 which is driven by the servo motor 50 along the rail 22 in the front-rear direction.

The cable track 18 includes a plurality of hollow frames pivotally coupled with each other in the front-rear direction. Inside the hollow frames, a cable 72 connecting the robot 64 and an external apparatus (not shown) is housed. For example, the cable 72 includes at least one of a power cable for supplying power such as oil pressure, air pressure, or electric power, and/or a communication cable capable of transmitting an electrical signal. The cable 72 has a connecting end 72a which is connected to the robot 64.

The cable track 18 is laid along the rail 22 at lower side of the rail 22. More specifically, the cable track 18 is laid at lower side of the rail 22 so as to be included in the downward projection region of the rail 22. One end 18a of the cable track 18 is fastened to a bottom surface 46c of the second part 46b of the leg 46, while the other end 18b (FIG. 1) of the cable track 18 is fastened to a center part of the upper surface of the base part 20. The cable track 18 extends forward from the end 18a in parallel with the rail 22, and is bent at the bent part 18c downward in a U-shape. Then, the cable track 18 extends rearward from the bent part 18c to the end 18b so as to be parallel to the rail 22.

As the carriage 14 is moved frontward, the bent part 18c of the cable track 18 also moves frontward. The cable 72 extending from the external apparatus (not shown) is inserted into the cable track 18 at the end 18b of the cable track 18, passes through the inside of the cable track 18, and is pulled out from the end 18a of the cable track 18. The cable 72 pulled out from the end 18a is routed so as to pass over the bottom surface 46c of the second part 46b of the leg 46, and over the left side surface and top surface of the first part 46a. The connecting end 72a of the cable 72 is connected to a connector 74 (FIG. 2) provided at the rear surface of the robot base 66. In this way, the connecting end 72a is exposed on the seat 44.

Thus, since the cable 72 routed by the cable track 18 is guided by the cable track 18 while being protected by it, the cable 72 can stably connect the robot 64 and the external apparatus without interfering with other members to be damaged and without entanglement, even when the carriage 14 is moving.

Figure 3:
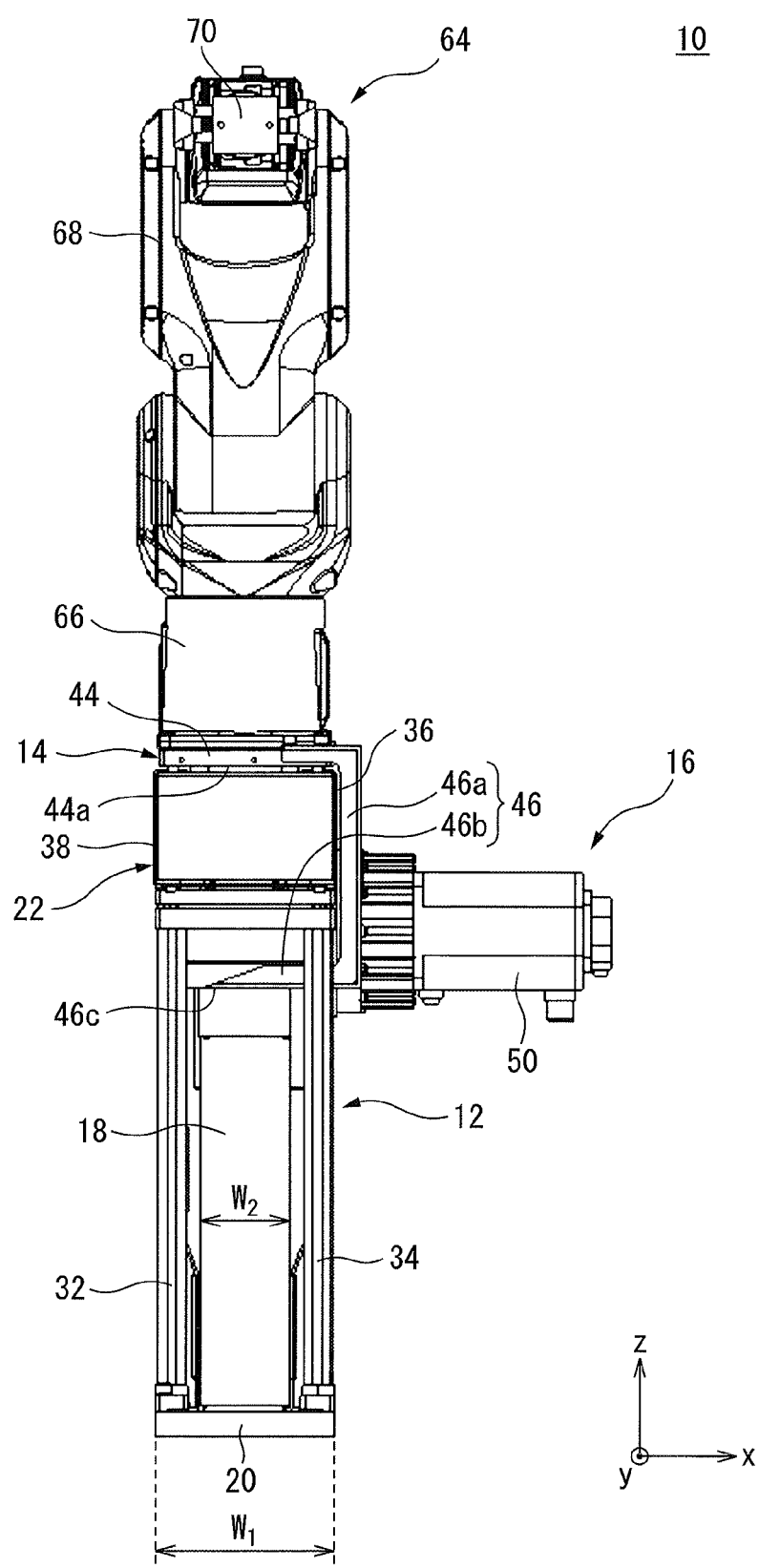
FIG. 3 is a view of the robot traveling system shown in FIG. 1 as seen from the front side.

In the present embodiment, the maximum widths in the left-right direction of the robot base 66 of the robot 64, the seat 44 of the carriage 14, and the rail 22 become substantially the same. Specifically, as shown in FIG. 3, if the width of the rail 22 in the left-right direction is indicated by $W_1$, the widths of the robot base 66 and the seat 44 in the left-direction direction are substantially the same as the width $W_1$. Here, the maximum width of the cable track 18 in the left-right direction is not more than the maximum width of the rail 22, robot base 66, and seat 44. Specifically, as shown in FIG. 2, if the width of the cable track 18 in the left-right direction is indicated by $W_2$, $W_2 \leq W_1$.

According to the present embodiment, the cable track 18 is supported by the leg 46 of the carriage 14 at lower side of the rail 22. Due to this, the width in the left-right direction of the space occupied by the rail assembly 12 and the cable track 18 can be reduced. Therefore, when machining devices or other machines are installed at the left side and/or right side of the rail 22 for example, the user can physically easily access these machines. As a result, it is possible to improve the work efficiency in the case of maintenance etc. of the machines.

Further, according to the present embodiment, the cable track 18 is arranged at lower side of the rail 22 so as to be included in the downward projection region of the rail 22, and the width $W_2$ of the cable track 18 is set to be not more than the width $W_1$ of the rail 22, robot base 66, and seat 44. According to this configuration, the cable track 18 can be reliably positioned between the left side wall 36 and right side wall 38 of the rail 22, without projecting out from the rail 22 to the left or right side. Therefore, it is possible to effectively reduce the width in the left-right direction of the space occupied by the rail assembly 12 and the cable track 18.

Further, according to the present embodiment, the servo motor 50 is fastened to a location separate from the carriage 14, i.e., the rear end 22a of the rail 22. According to this configuration, it is possible to downsize the carriage 14. Further, according to this configuration, it is not necessary for the cable track 18 to house a cable for transmission of power to the servo motor 50 in order to route this cable up to the carriage 14. Therefore, it is possible to downsize the cable track 18.

Figure 5:
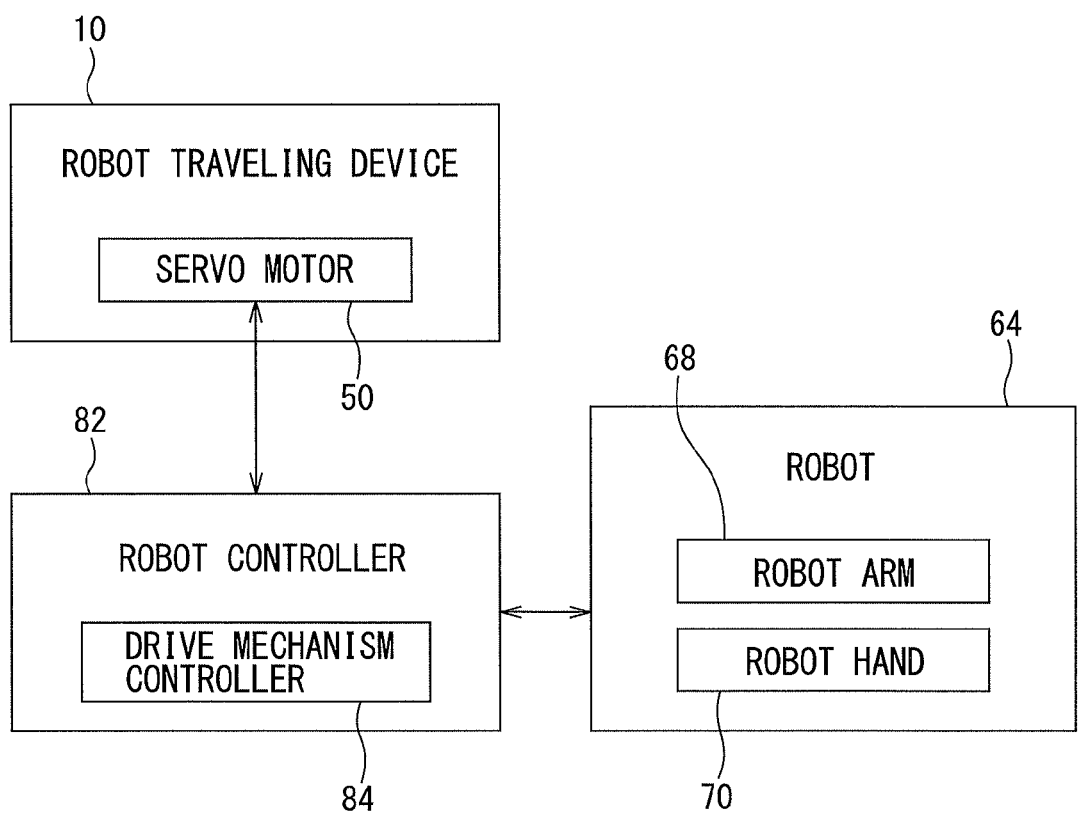
FIG. 5 is a block diagram of a robot system according to an embodiment of the present invention.

Next, referring to FIG. 1 to FIG. 5, a robot system 80 according to an embodiment of the present invention will be explained. Note that, elements similar to the above embodiment are assigned the same reference numerals and detailed explanations thereof will be omitted. As shown in FIG. 5, the robot system 80 includes a robot 64; a robot controller 82 which controls the robot 64; and a robot traveling system 10 which moves the robot 64.

The robot controller 82 includes e.g. a CPU and is mounted at an external apparatus installed outside of the robot traveling system 10. The robot controller 82 is electrically connected to the robot 64 via the cable 72, and controls the operations of the robot arm 68 and robot hand 70. The robot controller 82 is also electrically connected to the servo motor 50. In the present embodiment, the robot controller 82 functions as a drive mechanism controller 84 for controlling the operation of the servo motor 50 so as to drive the servo motor 50.

Next, the operation of the robot system 80 will be explained. When moving the robot 64 frontward from the position shown in FIG. 1, the robot controller 82 sends a command to the servo motor 50 so as to rotate the output shaft of the servo motor 50 counterclockwise as seen from the left side.

Then, the first pulley 56 fixed to the output shaft of the servo motor 50 rotates, and the timing belt 60 receives power from the first pulley 56 to turn so that the upper part of the timing belt 60 (i.e., the part of the timing belt 60 running just below the seat 44 between the right guide rail 40 and the left guide rail 42) moves frontward.

As the timing belt 60 runs to rotate, the second pulley 58 is also rotated. When the timing belt 60 runs to rotate in this way, the seat 44 engaging the timing belt 60 receives power from the timing belt 60. As a result, the carriage 14 and the robot 64 supported by the carriage 14 are moved frontward along the rail 22. Thus, the power generated by the servo motor 50 is transmitted to the carriage 14 by the power transmitter 52 comprised of the first pulley 56, the second pulley 58, and the timing belt 60.

When the robot 64 reaches the desired position, the robot controller 82 stops the rotation of the servo motor, then sends commands to the robot arm 68 and robot hand 70 so as to execute a desired work. After the robot 64 finishes the work, if the robot 64 is further needed to move frontward, the robot controller 82 further rotates the servo motor 50 counterclockwise as seen from the left side so as to move the carriage 14 and the robot 64 frontward. On the other hand, if the robot 64 is needed to move rearward, the robot controller 82 rotates the servo motor 50 clockwise as seen from the left side so as to move the carriage 14 and the robot 64 rearward.

According to the present embodiment, the robot controller 82 controls the robot arm 68 and robot hand 70 of the robot 64 and also controls the servo motor 50 of the robot traveling system 10. According to this configuration, it is possible to synchronize the robot 64 and the carriage 14, and therefore a coordinated operation, such as moving the carriage 14 with operating the robot 64, becomes possible.

Further, according to the present embodiment, a servo motor 50 is employed as a power generator for generating power to move the carriage 14. Due to this, the robot controller 82 can control the operation for moving and stopping the robot 64 at a desired location of the rail 22 in a highly precise manner.

Note that in the present embodiment, a case in which the robot controller 82 has the function as a drive mechanism controller 84 was explained, but the invention is not limited to this. The drive mechanism controller 84 may also be provided separately from the robot controller 82.

Figure 6:
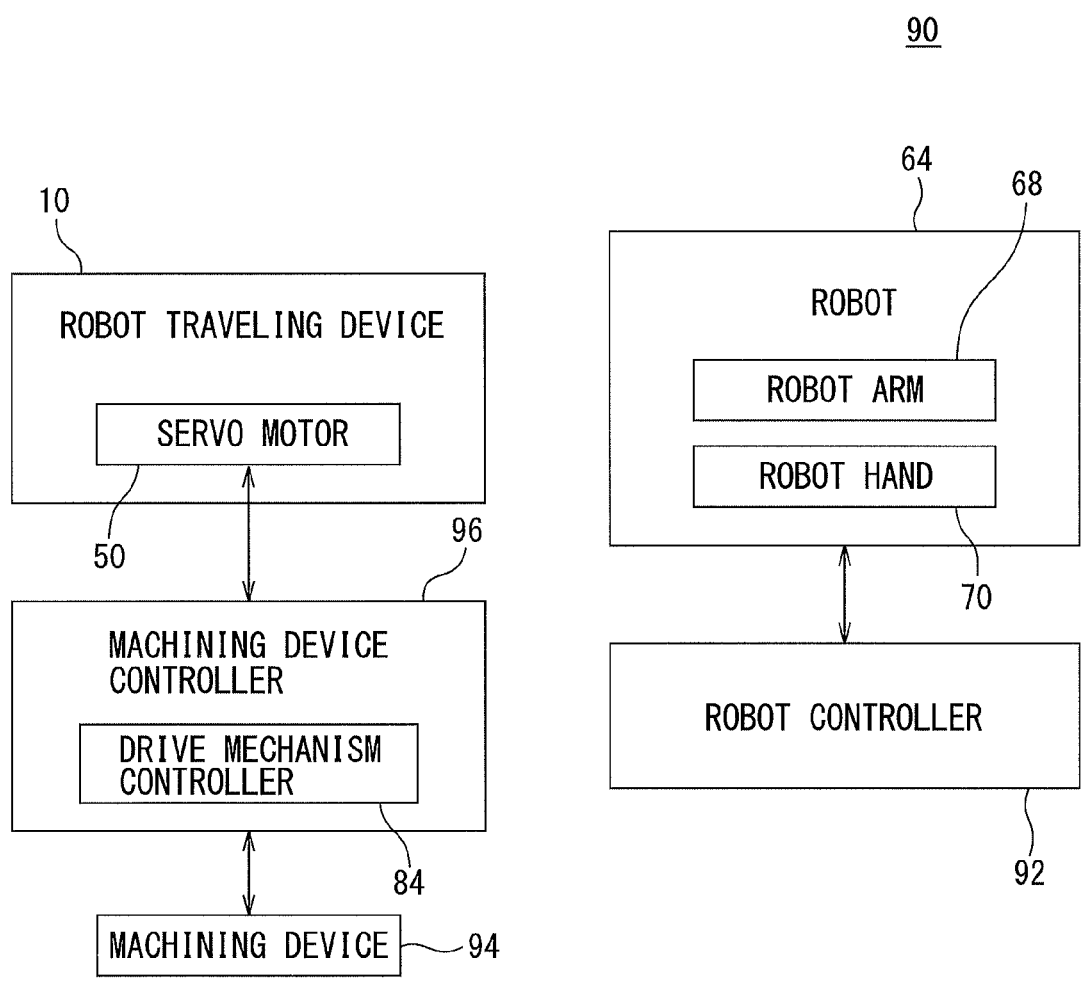
FIG. 6 is a block diagram of a machining system according to an embodiment of the present invention.

Next, referring to FIG. 1 to FIG. 4, FIG. 6, and FIG. 7, a machining system 90 according to an embodiment of the present invention will be explained. Note that, elements similar to the above embodiment are assigned the same reference numerals and detailed explanations thereof will be omitted. As shown in FIG. 6, the machining system 90 includes a robot 64; a robot controller 92 for controlling the robot 64; a robot traveling system 10 for moving the robot 64; machining devices 94; and a machining device controller 96 for controlling the machining devices 94.

Figure 7:
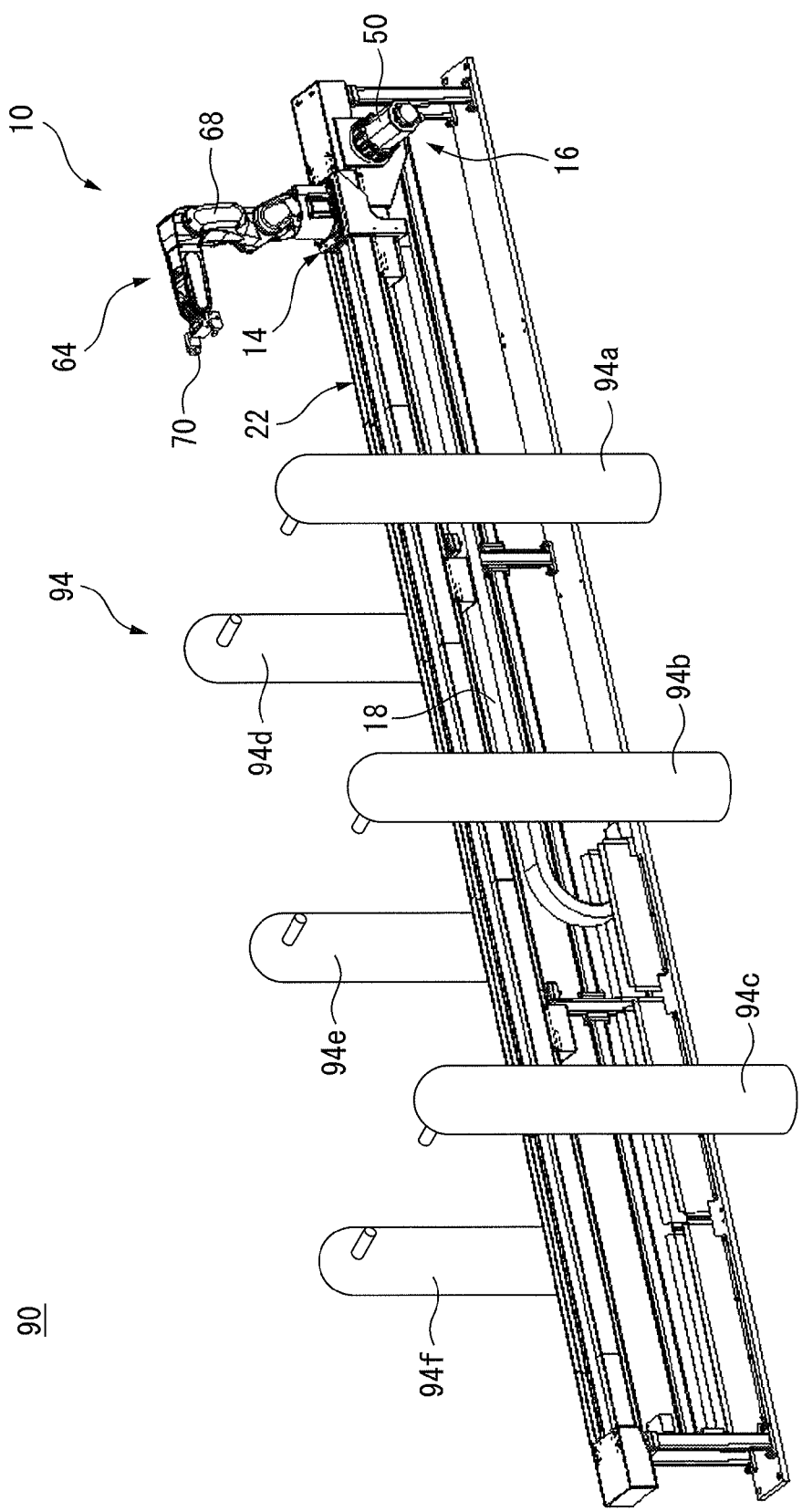
FIG. 7 is a perspective view of the machining system shown in FIG. 6.

As shown in FIG. 7, a plurality of machining devices 94 are arranged along the rail 22 and include machining devices 94a, 94b, and 94c which are arranged at the left side of the rail 22 and machining devices 94d, 94e, and 94f which are arranged at the right side of the rail 22.

The robot controller 92 includes e.g. a CPU and is mounted in an external apparatus installed outside of the robot traveling system 10. The robot controller 92 is electrically connected to the robot 64 via a cable 72 and controls the operations of the robot arm 68 and the robot hand 70.

On the other hand, the machining device controller 96 includes e.g. a CPU and is mounted at an external apparatus. The machining device controller 96 controls the operation of each of the machining devices 94. Further, the machining device controller 96 is electrically connected to the servo motor 50. In the present embodiment, the machining device controller 96 functions as a drive mechanism controller 84 for controlling the operation of the servo motor 50 so as to drive the servo motor 50.

Next, the operation of the machining system 90 will be explained. The machining system 90 is for gripping a workpiece by a robot 64, conveying the workpiece to the position of each of the machining devices 94 by moving the robot 64 with the robot traveling system 10, and machining the workpiece by the machining devices 94.

When machining the workpiece by the machining devices 94, first, the robot controller 92 sends commands to the robot arm 68 and the robot hand 70 so as to grip the workpiece. Then, the machining device controller 96 drives the servo motor 50 to rotate and moves the carriage 14 and robot 64 forward from the position shown in FIG. 1 via the power transmitter 52.

When the robot 64 reaches the position of the machining devices 94a and 94d, the machining device controller 96 stops the servo motor 50, and sends commands to the machining devices 94a and 94d so as to machine the workpiece. After the machining devices 94a and 94d finish the work, the machining device controller 96 again drives the servo motor 50 so as to move the carriage 14 and robot 64 to the position of the machining devices 94b and 94e.

Then, the machining device controller 96 make the machining devices 94b and 94e to machine the workpiece. In the same way, the machining device controller 96 moves the carriage 14 and robot 64 to the position of the machining device 94c and 94f, and makes the machining devices 94c and 94f to machine the workpiece. Thus, the machining device controller 96 moves the carriage 14 and robot 64 along the rail 22, and sequentially machines the workpiece by the machining devices 94.

According to the present embodiment, the machining device controller 96 controls the machining devices 94 and also controls the servo motor 50 of the robot traveling system 10. According to this configuration, it is possible to synchronize the machining devices 94 and carriage 14, and therefore it is possible to control the position of the carriage 14 in a highly precise manner, in response to the state of process.

Note that in the above embodiment, a case in which a servo motor 50 was employed as the power generator which generates the power for making the carriage 14 move was explained. However, the invention is not limited to this for example. It is possible to apply any apparatus such as an oil pressure cylinder so long as power can be generated.

Further, in the above embodiment, the case where the power transmitter 52 was configured by a first pulley 56, second pulley 58, and timing belt 60 was explained. However, the invention is not limited to this. For example, it may be applied to any apparatus, such as a ball screw mechanism, which is able to transmit power which is generated by a power generator to the carriage 14.

Further, in the above embodiment, the case where carriage 14 was configured by a seat 44 and a leg 46 separate from that seat 44 was explained. However, the invention is not limited to this. The seat 44 and leg 46 may be integrally formed so as to form a carriage 14 comprised of a single member.

Further, in the above embodiment, the case where the maximum width $W_2$ of the cable track 18 in the left-right direction is not more than the maximum width $W_1$ of the rail 22, robot base 66, and seat 44 and the cable track 18 as a whole is arranged so as to fit in the downward projection region of the rail 22 was explained. However, the invention is not limited to this. The cable track 18 need only be arranged at the bottom side of the rail 22. More specifically, at least part of the cable track 18 should be included in the downward projection region of the rail 22.

Further, in the above embodiment, the case where the motor 50 was fastened to the rear end 22a of the rail 22 was explained. However, the invention is not limited to this. The motor 50, for example, may be set at the outside of the robot traveling system 10. In this case, the motor 50 is arranged stationary with respect to the rail 22 (that is, to be unable to move with respect to the rail 22).

Above, the present invention was explained through embodiments of the present invention, but the above embodiments do not limit the invention relating to the claims. Further, all combinations of features which were explained in the embodiment are not necessarily essential for the invention. Further, the above embodiments can be changed or improved in various ways as clear to a person skilled in the art. Such changed or improved embodiments are also included in the technical scope of the present invention as clear from the claim language.

Further, it should be noted that the operations, routines, steps, stages, and other processing in the apparatus, system, program, and method in the claims, specification, and drawings, unless particularly clearly indicated by "before", "in advance of", etc. or the output of prior processing being used for later processing, can be realized in any order. In the flow of operations in the claims, specification, and drawings, even if explained using "first", "next (or then)", etc. for convenience, this does not mean the execution in this order is essential.

The invention claimed is:

1. A robot traveling system comprising:
   a rail;
   a carriage movable along the rail and supporting a robot;
   a drive mechanism driving the carriage; and
   a cable track connected to the carriage and housing a cable having a connecting end connected to the robot, the cable track being laid along the rail at a lower side of the rail,
   wherein the drive mechanism includes a belt for moving the carriage, and wherein the cable track is connected to the carriage at a location beneath the belt.

2. The robot traveling system according to claim 1, wherein the drive mechanism includes:
   a power generator arranged stationary with respect to the rail; and
   a power transmitter transmitting power generated by the power generator to the carriage.

3. The robot traveling system according to claim 2, wherein the power generator includes a servo motor.

4. The robot traveling system according to claim 3, wherein the power transmitter includes the belt, which is a timing belt connected to an output shaft of the servo motor.

5. A robot system comprising:
   the robot traveling system according to claim 1;
   the robot placed on the carriage; and
   a robot controller controlling the robot.

6. The robot system according to claim 5, wherein
   the robot controller and the drive mechanism are electrically connected via a cable,
   the robot controller controls the drive mechanism.

7. The robot system according to claim 5, further comprising a drive mechanism controller controlling the drive mechanism.

8. A machining system comprising:
   the robot traveling system according to claim 1;
   the robot placed on the carriage;
   a machining device arranged along the rail;
   a robot controller controlling the robot; and
   a machining device controller controlling the machining device.

9. The machining system according to claim 8, wherein the machining device controller controls the drive mechanism.

10. A robot traveling system comprising:
    a rail;
    a carriage movable along the rail and supporting a robot;
    a drive mechanism driving the carriage;
    a cable track connected to the carriage and housing a cable having a connecting end connected to the robot, the cable track being laid along the rail at a lower side of the rail;
    a seat placed on the rail; and
    a leg extending downward from the seat so as to be connected to the cable track at a lower side of the rail, wherein the leg includes an aperture through which the drive mechanism passes.

11. The robot traveling system according to claim 10, wherein the drive mechanism is mechanically connected to a bottom part of the seat and gives power to the seat.

12. The robot traveling system according to claim 10, wherein the connecting end of the cable is arranged exposed on the seat.

13. The robot traveling system according to claim 10, wherein
    a base of the robot fastened to the carriage, the seat, and the rail have substantially the same maximum width in a direction perpendicular to the direction of extension of the rail,
    the cable track has a maximum width in the direction perpendicular to the direction of extension of the rail which is not more than the maximum width of the base of the robot, the seat, and the rail.

14. The robot traveling system according to claim 10, wherein the drive mechanism includes a belt for moving the carriage, and the belt is guided by a belt guide, wherein the belt guide is sized to pass through the aperture in the leg.

* * * * *